WILLIAM F. KETCHUM'S
IMPROVEMENT IN HARVESTERS
4484
Ketchum Harvesting Machine Co.
Owners
REISSUED JUL 25 1871
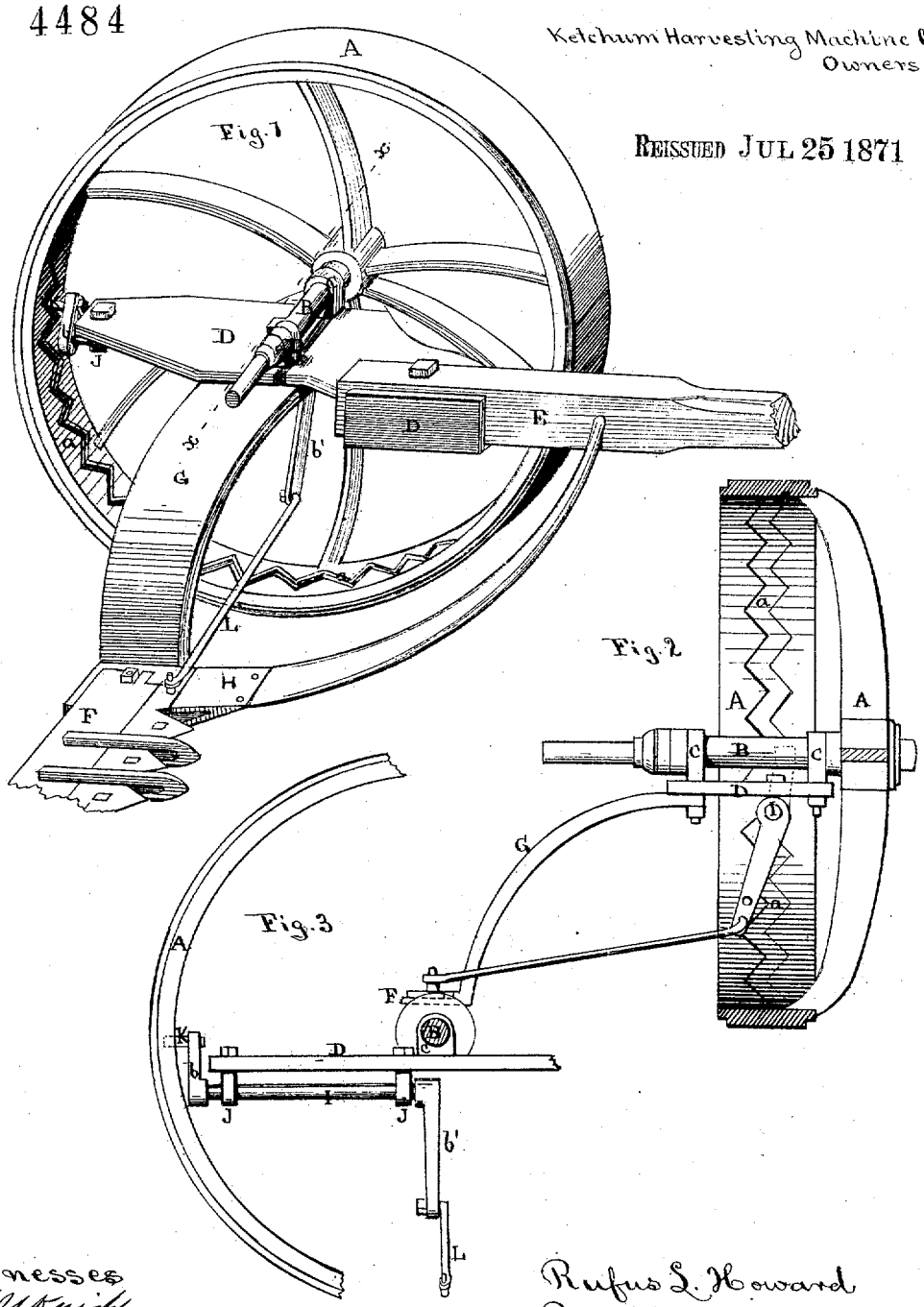
Witnesses
J. Y. Knight
P. Hannay
Rufus L. Howard
Pres't. Ketchum Harvesting Machine Co.
by A. McCallum
Atty.
N. PETERS, PHOTO-LITHOGRAPHER, WASHINGTON, D. C.

UNITED STATES PATENT OFFICE.

KETCHUM HARVESTING-MACHINE COMPANY, OF BUFFALO, N. Y., ASSIGNEE, BY MESNE ASSIGNMENTS, OF WILLIAM F. KETCHUM, DECEASED.

IMPROVEMENT IN HARVESTERS.

Specification forming part of Letters Patent No. 20,719, dated June 29, 1858; reissue No. 4,484, dated July 25, 1871.

*To all whom it may concern:*

Be it known that WILLIAM F. KETCHUM, (deceased,) late of Buffalo, in the State of New York, invented certain Improvements in Harvesters, of which the following is a specification:

The invention relates to improvements in that class of machines which may be used either for mowing grass or harvesting grain; and the invention consists in constructing the driving-wheel and its axle, and arranging the same with relation to the other parts of the machine, in the manner to be hereinafter described, so that the frame to which the draft is attached, the mechanism by which the cutters are operated, and the greater portion of the frame by which the finger-bar is supported, shall be suspended from or arranged upon the axle within the rim of the driving-wheel, and so that the resistance due to the drag and weight of the wheel itself, the frame, and the mechanism by which the cutters are operated shall counterpoise the resistance due to the weight and drag of the finger-bar and cutters, thereby rendering the machine strong and compact, and obviating undue side draft, heretofore a great objection to the use of such machines.

In the accompanying drawing, Figure 1 is a perspective view of the machine. Fig. 2 is a sectional view taken on the line *x x* of Fig. 1. Fig. 3 is a sectional view, showing the relative positions of the frame and rock-shaft with the wheel and axle.

A represents the driving-wheel, so constructed as that the plates or spokes are placed on the side of the wheel opposite to the cutter-bar, and connect with the hub outside the rim, leaving the entire space within the rim of the wheel available for the purpose of placing therein the supporting-frame, rock-shaft, pitman-gearing, &c. B is the axle or main shaft of the driving-wheel, to which the main frame D is suspended by means of the journal-boxes *c c*. The frame D is thus placed mainly within the rim of the wheel, its forward end projecting beyond it, for the purpose of supporting the end of the draft-pole E at a point relatively between the wheel and the heel of the finger-bar. F is the finger-bar, suspended close to the ground in a vertical plane with the line of the axle by means of an arm or frame, G, secured to the frame D at a point beneath and in line with the axle B. The heel of the finger-bar is further supported by a shoe, H, which extends upward and forward to the draft-pole, to which it is secured. I is the rock-shaft, having arms *b b'* on its ends. It is suspended in a horizontal position beneath the frame D by pendent journal-boxes J J. K is a friction-roller secured to the arm *b* of the rock-shaft. It engages with the cam or zigzag groove *a* of the driving-wheel, and thereby imparts the vibratory movement to the cutters, which are connected with the rock-shaft by pitman L.

In a machine thus constructed it will be seen that the frame, a large portion of which is within the rim of the driving-wheel, the finger-bar, rock-shaft, pitman, &c., is suspended from the axle or main shaft of the driving-wheel, and that the line of draft is placed at a point between the heel of the finger-bar and the wheel, so that the resistance due to the weight and drag of the finger-bar and cutters will be counterpoised by the resistance due to the weight and drag of the wheel itself and the weight of the frame and operating mechanism suspended within it. Again, through the mechanism for operating the cutters being placed entirely within the rim of the wheel, and consequently protected thereby, it is also obvious that the same is less liable to be injured or clogged than if not so protected; and, as a whole, it is evident that a machine so constructed combines in an unusual degree great simplicity of form with strength and compactness.

As the general operation of the machine is the same as in others of its class, to those skilled in the art it will be unnecessary further to describe it.

What is claimed as the invention is—

1. The combination, substantially as described, of the driving-wheel A, with the frame for supporting the finger-bar and the mechanism for operating the cutters, said frame being suspended from the axle in the position described, substantially as and for the purpose set forth.

2. The combination of a driving-wheel, A, frame D, draft-pole E, and finger-bar F with the mechanism for operating the cutters, the whole arranged substantially as and for the purpose specified.

RUFUS L. HOWARD,
*Prst. Ketchum Harvesting Machn. Co.*

Witnesses:
M. G. HUGHSON,
S. FINLEY.